United States Patent [19]
Ignatov et al.
[11] 3,808,518
[45] Apr. 30, 1974

[54] PULSED VHF RADIO SPECTROMETER FOR INVESTIGATION OF NUCLEAR QUADRUPOLE RESONANCE IN SOLIDS

[76] Inventors: Boris Grigorievich Ignatov, Moskovskoi oblasti, ulitsa Lenina; Anatoly Leonidovich Alexandrov, Moskovskoi oblasti, ulitsa Vokzalnaya, 19, kv.32; Boris Nikolaevich Pavlov, Moskovskoi oblasti, ulitsa Vokzalnaya, 19, kv.32; Alexandr Timofeevich Sergeev, Moskovskoi oblasti, ulitsa Popova, 10, kv. 2, all of Fryazino Moskovskoi oblasti, U.S.S.R.

[22] Filed: Oct. 20, 1971

[21] Appl. No.: 190,702

[52] U.S. Cl. .................... 324/0.5 R
[51] Int. Cl. .................... G01n 27/78
[58] Field of Search ........ 324/0.5 R, 0.5 A, 0.5 AC, 324/0.5

[56] References Cited
UNITED STATES PATENTS
3,515,981 6/1970 Smith .................... 324/0.5 A

*Primary Examiner*—Michael J. Lynch
*Attorney, Agent, or Firm*—Eric H. Waters

[57] ABSTRACT

A pulsed VHF radio spectrometer for the invenstigation of nuclear quadrupole resonance (NQR) in solids, in which the tuning arrangements of the anode and grid tanks in a double-tank r.f. pulse oscillator are kinematically linked to each other and to the tuning arrangement of the tuned circuit of a local oscillator by means of a drive having a programmer. The latter is made such that the grid tank in the r.f. pulse oscillator and the local-oscillator tuned circuit are swept in frequency in a predetermined manner. The radio spectrometer disclosed herein has an inductance coil to enclose the solid test specimen, which is electrically connected to the r.f. pulse oscillator through a matching means which matches the impedance of the inductance coil to the impedance of the anode tank in the r.f. pulse oscillator. The circuit parameters of the matching means and the circuit parameters of the inductance coil determine the above-mentioned manner for frequency sweeping.

3 Claims, 4 Drawing Figures

PULSED VHF RADIO SPECTROMETER FOR INVESTIGATION OF NUCLEAR QUADRUPOLE RESONANCE IN SOLIDS

The present invention relates to radio spectrometry, and more specifically to pulsed VHF radio spectrometers for the investigation of nuclear quadrupole resonance (NQR) in solids with respect to determining their physico-chemical properties.

Known in the prior art are pulsed VHF radio spectrometers for the investigation of NQR in solids, in which the tuning arrangements of the anode and grid tanks of a double-tank r.f. pulse oscillator are kinematically linked to each other and to the tuned circuit of a local oscillator by means of a drive, while an inductance coil containing a solid test specimen is electrically connected to the r.f. pulse oscillator.

These prior-art radio spectrometers are subject to the disadvantage in that, during operation at radio frequencies (above 120 MHz), the inductance coil must have a small number of turns, which, in effect, on the one hand reduces the amplitude of the electromagnetic field strength within the volume of the test specimen, and on the other hand, reduces the magnetic-flux linkage between the signal and the inductance coil. As a result, there is provided a deterioration in the sensitivity of the radio spectrometer with regard to NQR signals. Furthermore, the kinematic link between the grid and anode tanks of the r.f. pulse oscillator and the local-oscillator tuned circuit is such that the frequency of the grid tank of the r.f. pulse oscillator and the frequency of the local-oscillator tuned circuit are swept linearly which, when the radio spectrometer operates in the VHF band, reduces the power output of the r.f. pulse oscillator and, as a consequence, the sensitivity of the radio spectrometer.

The object of the present invention is to provide a pulsed VHF radio spectrometer for the investigation of nuclear quadrupole resonance (NQR) in solids, having a high and uniform degree of sensitivity over the entire VHF band.

With this object in view, the present invention resides in that in a pulsed VHF radio spectrometer for the investigation of NQR in solids, the tuning arrangements of the anode and grid tanks of a double-tank r.f. pulse oscillator are kinematically linked to each other and to the tuning arrangement of the local-oscillator tuned circuit by a drive, the inductance coil containing the solid test specimen being electrically connected to the r.f. pulse oscillator. Additionally, the drive is, according to the invention, fitted with a programmer so that the frequency of the grid tank of the r.f. pulse oscillator and the frequency of the local-oscillator tuned circuit are swept in a predetermined manner while electrical connection between the inductance coil and the r.f. pulse oscillator is provided for by a matching means which matches the impedance of the inductance coil to the impedance of the anode tank in the r.f. pulse oscillator and whose circuit parameters together with the circuit parameters of the inductance coil determine the requisite manner for sweeping the frequencies of the grid tank of the r.f. pulse oscillator and the local-oscillator tuned circuit.

The programmer may be in the form of a cam mechanism the cams of which are mounted on a common shaft in the drive, in which each cam is profiled whereby the frequency of the grid tank in the r.f. pulse oscillator and the frequency of the local-oscillator tuned circuit will be swept in a predetermined manner.

It is preferable to make the means for matching the impedance of the inductance coil to the impedance of the anode tank in the r.f. pulse oscillator in the form of two capacitors which are connected directly to the inductance coil, and long lines connecting the capacitors to the anode tank of the r.f. pulse oscillator.

This form of matching means, together with the programmer for sweeping the frequency of the grid tank of the r.f. pulse oscillator and the local-oscillator tuned circuit, enhances the sensitivity of the pulsed radio spectrometer disclosed herein with respect to NQR signals whose resonant frequencies lie within the VHF band and ensures a uniform sensitivity of this radio spectrometer to NQR signals over the full operating frequency range.

The invention will be more fully understood from the following description of a preferred embodiment when read in connection with the accompanying drawings, wherein.

Figure 1:
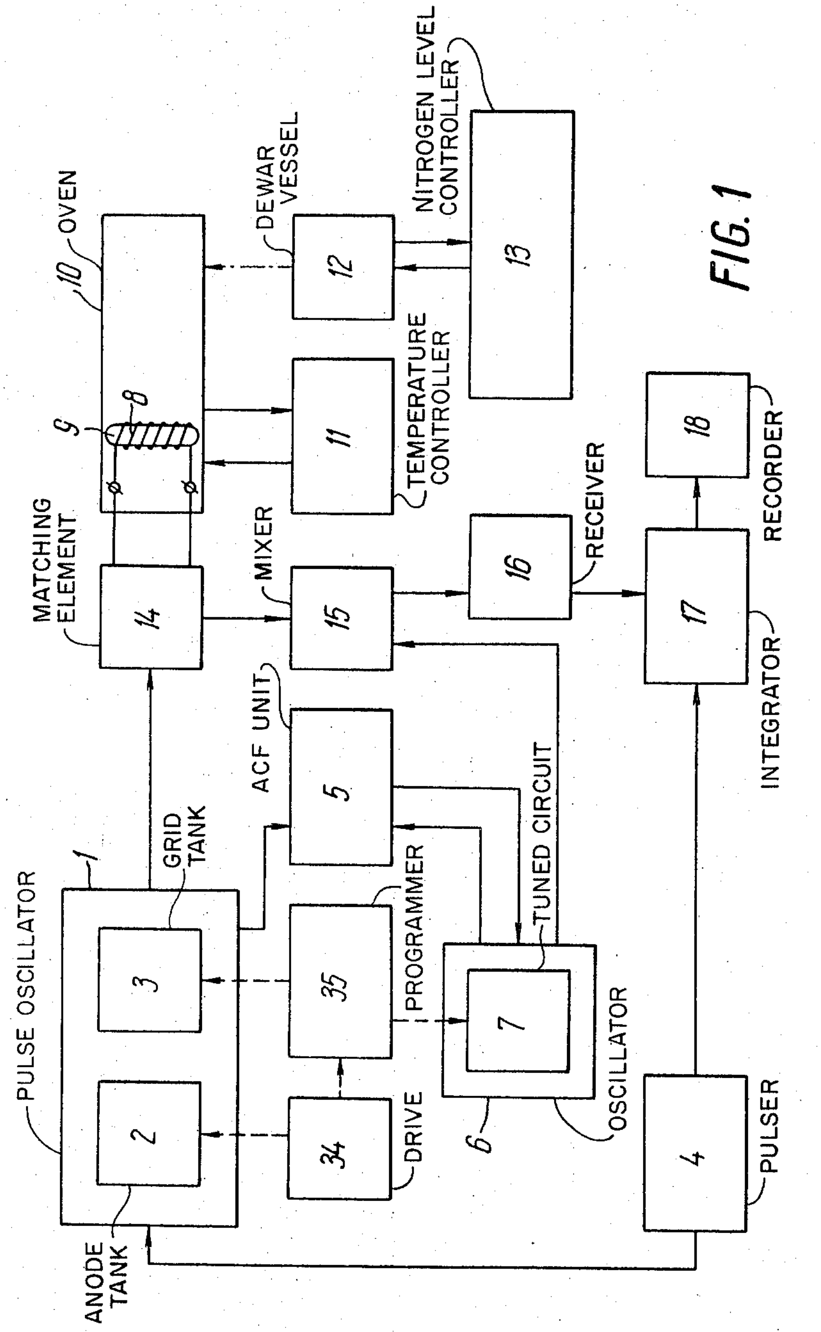
FIG. 1 is a block-diagram of a pulsed VHF radio spectrometer for the investigation of NQR in solids, according to the invention.

Referring to FIG. 1, there is illustrated a pulse VHF radio spectrometer for the investigation of nuclear quadrupole resonance (NQR) in solids, which comprises a double-tank r.f. pulse oscillator 1 with an anode tank 2 and a grid tank 3, whose input is connected to a pulser 4, while one of the outputs is connected to the input of an AFC unit 5 the other input of which accepts the output of a local oscillator 6 using a tuned circuit 7. The output of the AFC unit 5 is connected to the input of the local oscillator 6.

The other output of the r.f. pulse oscillator i is electrically connected to an inductance coil 8 which encloses the solid test specimen 9 and is placed in a constant-temperature oven 10 whose temperature can be maintained constant at any point between −170° and +200°C by a temperature controller 11.

In order to determine the physico-chemical properties of the solid specimen 9 at the temperature of liquid nitrogen, the specimen 9 within the inductance coil 8 is placed in a Dewar vessel 12 where the level of liquid nirogen is maintained by a liquid-nitrogen level controller 13.

Electrical connection between the inductance coil 8 and the r.f. pulse oscillation 1 is effected by a matching means 14 which matches the impedance of the inductance coil 8 to the impedance of the anode tank 2 of the oscillator 1.

The matching means 1 is connected to a mixer 15 which also accepts the output of the local oscillator 6. The output of the mixer 15 is connected to a receiver 16 coupled via an integrator 17 to a recorder 18. The integrator 17 is also connected to the pulser 4.

In the embodiment of the invention under consideration, the r.f. pulse oscillator is a push-pull, grounded cathode double-tank self-oscillator using bridge feedback.

The anode tank 2 of the oscillator 1 is made up of the output capacitance of a medium-power r.f. valve 19 and a two-wire balanced long line 20 which is tunable by a tuning arrangement in the form of a short-circuiting bridge 21 located on one end, while on the other end the line 20 is electrically connected via the matching means 14 to the inductance coil 8 containing the solid test specimen 9.

The grid tank 3, formed by the input capacitance of the valve 19 and a two-wire balanced long line 22 tunable by a tuning arrangement in the form of a short-circuiting bridge 23, determines together with feedback capacitors 24 and 25 the conditions of oscillation for the oscillator 1.

Figure 3:
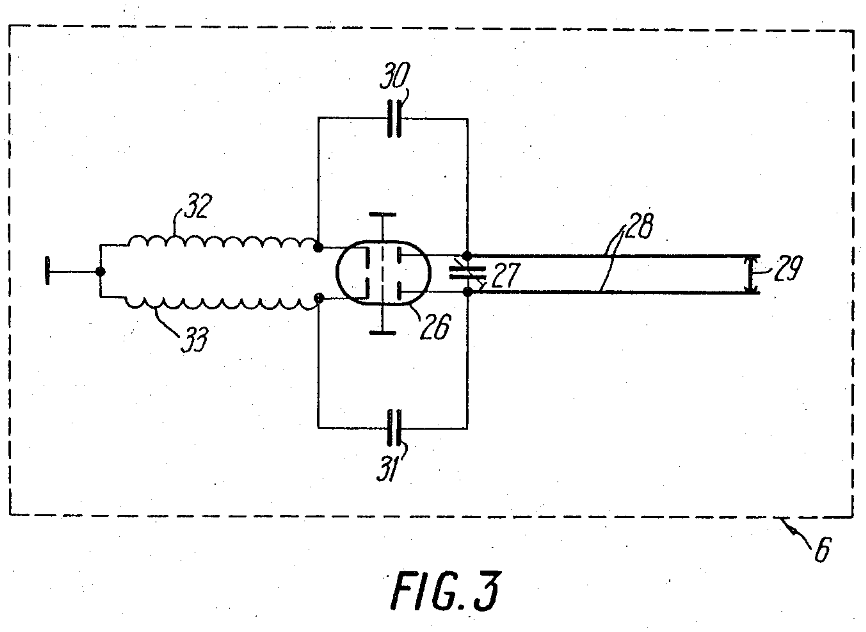
FIG. 3 is a circuit-schematic diagram of the local oscillator of the radio spectrometer of FIG. 1.

The local oscillator 6 (FIG. 3) of the radio spectrometer disclosed herein is a push-pull, grounded-grid, single-tuned self-oscillator.

The tuned circuit 7 of the local oscillator 6 is formed by the output capacitance of a low-power r.f. valve 26, the capacitance of a trimmer capacitor 27 and a two-wire balanced long line 28 which is tunable by a tuning arrangement in the form of a short-circuiting bridge 29. The feedback capacitors 30 and 31 return the anode of the valve 26 to its cathode which is further returned to earth via r.f. chokes 32 and 33. The function of the trimmer capacitor 27 is to ensure perfect tracking between the local oscillator 6 and the r.f. pulse generator with the aid of the AFC unit 5.

Figure 2:
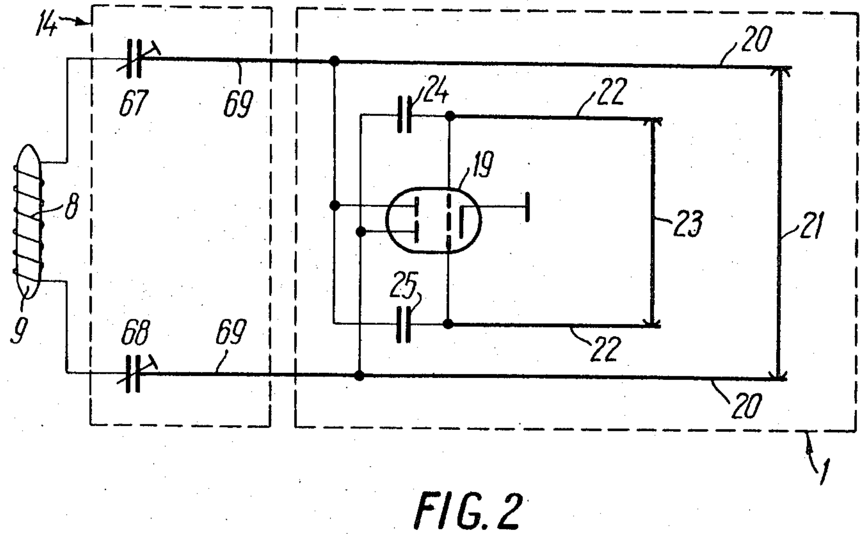
FIG. 2 is a circuit-schematic diagram of the r.f. pulse oscillator, the matching means, and the inductance coil enclosing a specimen, of the pulsed radio spectrometer of FIG. 1.

The short-circuiting bridges 21 and 23 (FIG. 2) of the two-wire balanced long lines 20 and 22 of the r.f. pulse oscillator 1 are kinematically linked to each other and to the short-circuiting bridge 29 (FIG. 3) of the two-wire balanced long line 28 of the local oscillator 6 by means of a drive 34 (FIG. 1) which incorporates a programmer 35. This programmer 35 is set so that the grid tank 3 in the r.f. pulse oscillator and the tuned circuit 7 of the local oscillator 6 are swept in frequency in a predetermined manner. This manner is determined by the circuit parameters of the matching means 14 and the circuit parameters of the inductance coil 8.

The drive 34 (FIG. 4) comprises an electric motor 36 having a shaft which mounts a gear box 37. The driven shaft of the gear box 37 is coupled by a friction coupling 38 to the shaft of a backlash-free reducing vernier 39 having an output shaft 40 which is coupled by a flexible coupling 41 to a shaft 42. Fastened to the latter is a backlash-free gear 43 meshing with an idler gear 44 which, in turn, engages a backlash-free gear 45 fastened to the shaft of a pulley 46. The shaft 42 also mounts a backlash-free gear 47 meshing with an idler gear 48 which engages a backlash-free gear 49 fastened onto a shaft 50.

The grooves on the pulley 46 and sheaves 51 entrain therebetween a cord 52 which is anchored to the short-circuiting bridge 21 of the two-wire balanced long line 20 of the anode tank 2 of the r.f. pulse oscillator 1. Cords 53 and 54 are respectively anchored to the short-circuiting bridge 23 of the two-wire balanced long line 22 of the grid tank 3 of the r.f. pulse oscillator 1 and to the short-circuiting bridge 29 of the two-wire balanced long line 28 of the tuned circuit 7 of the local oscillator 6 and serve to move the respective short-circuiting bridges 23 and 29.

Figure 4:
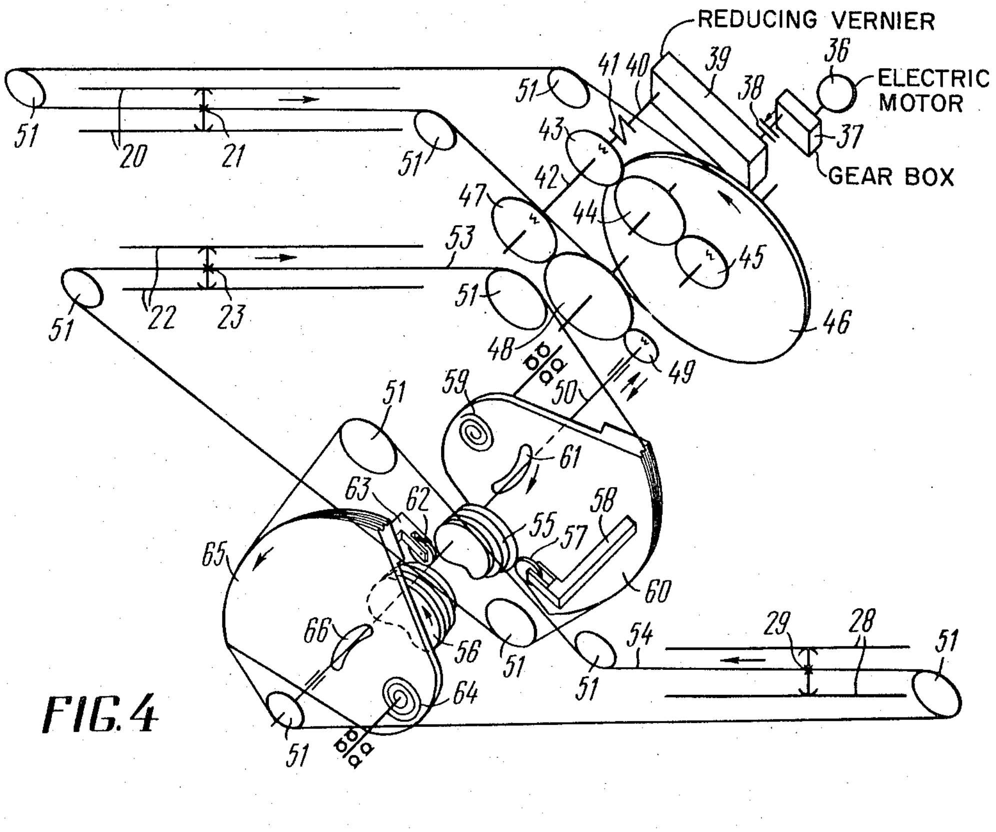
FIG. 4 shows the kinematic chain arrangement of the drive and programmer of the radio spectrometer, the two-wire balanced lines of the r.f. pulse oscillator and local oscillator of the same radio spectrometer.

The programmer 35 (FIG. 1) is in the form of a cam mechanism comprising cams 55 and 56 (FIG. 4), respectively, for the grid tanks 3 of the r.f. pulse oscillator 1 and the tuned circuit 7 of the local oscillator 6, mounted on the same shaft 50 of the drive 34 (FIG. 4). Each cam 55 and 56, is profiled so that the grid tank 3 and the tuned circuit 7 are swept in a frequency in the above-mentioned predetermined manner.

The cams 55 (FIG. 4) interact with a roller 57 which is free to rotate on the pivot of a driver 58 fastened on a sector 60 which is loaded by a spiral spring 59 and which has a slot 61 through which the shaft 50 passes. The cord 53 is entrained in the grooves in the sector 60 and the sheaves 51.

The cams 56 interact with a roller 62 which is free to rotate on the pivot of a driver 63 fastened on a sector 65 which is loaded by a spiral spring 64 and has a slot 66 through which the shaft 50 passes. The cord 54 is entrained in the grooves in the sector 65 and the sheaves 51.

The matching means 14 (FIG. 2) for matching the impedance of the inductance coil 8 to the impedance of the anode tank 2 in the r.f. pulse oscillator 1 has the form of two capacitors 67 and 68 which are connected directly to the inductance coil 8, and to long lines 69 which connect the capacitors 67 and 68 to the two-wire balanced long line 20 of the anode tank 2 in the r.f. pulse oscillator 1.

In the embodiment of the invention under consideration, the pulser 4 (FIG. 1) is provided with valves and serves to synchronize operation of the entire radio spectrometer and to generate pulses which modulate the r.f. pulse oscillator 1.

The AFC unit 5 comprises a mixer, a discriminator, and an output stage. The mixer 15 uses a dual r.f. triode positioned in a push-pull circuit. The signal is applied to the grids of the mixer 15 from the matching means 14. The anode load of the mixer 15 is a resonant circuit which is tuned to the intermediate frequency.

The receiver 16 is an i.f. amplifier whose passband can be adjusted to any value between 100 and 800 kHz.

The integrator 17 is a capacitive pulse-signal integrator.

The constant-temperature oven 10 is essentially a chamber where the inductance coil 8 and the test specimen 9 are placed. Wound along the walls of the chamber is a heater which is electrically connected to the temperature controller 11. Attached on the outside of one of the oven walls is a platinum resistance thermometer whose indications are conveyed to the temperature controller 11.

In order to obtain temperatures below +50°C, the oven is cooled with liquid nitrogen.

The temperature controller 11 consists of an automatic bridge and a voltage regulator.

The liquid-nitrogen level controller 13 consists of a small-diameter tube which is provided with a heater at one end and with a valve at the other, a transistor circuit to control the heater, and a nitrogen level sensor using a crystal diode. The liquid-nitrogen level controller 13 is mounted on the neck of the Dewar vessel 12.

The pulsed VHF radio spectrometer for the investigation of NQR in solids disclosed herein operates as follows.

The r.f. pulse oscillator 1 (FIG. 1) produces a sequence of short strong r.f. pulses, the number of pulses in a sequence being one, two or four, depending on the mode of operation of the radio spectrometer determined by the pulser 4. Via the matching means 14, the energy of the strong pulses furnished by the oscillator 1 acts upon the solid specimen 9 located within the inductance coil 8.

If the frequency of the pulses is the same as that of NQR of the specimen, the first pulse applied thereto will generate a nuclear induction signal, while the second pulse will provide a spin echo signal after an elapsed time interval corresponding to twice the distance between the two pulses. These signals are sensed by the inductance coil 8 and routed via the mixer 15 to the input of the receiver 16. From the output of the latter, the nuclear induction and spin echo signals are applied to the integrator 17 which makes it possible to discern weak signals from a background of noise by improving the signal-to-noise ratio at the output by 20 to 30 times in comparison with that at the input. The signals are recorded by the recorder 18 on a suitable strip chart.

The tuning of the radio spectrometer can be varied automatically or manually, using the drive 34 and the programmer 35. The drive 34 is directly coupled to the short-circuiting bridge 21 (FIG. 2) of the two-wire balanced line 20 of the anode tank 2 in the r.f. pulse oscillator 1, and and also, via the programmer 35, to the short-circuiting bridge 23 of the two-wire balanced line 22 of the grid tank 3 in the r.f. pulse oscillator and to the short-circuiting bridge 29 (FIG. 3) of the two-wire balanced line 28 of the tuned circuit 7 in the local oscillator 6.

The programmer 35 (FIG. 1) ensures that the grid tank 3 of the oscillator 1 and the tuned circuit 7 of the local oscillator are swept in frequency in a predetermined manner.

The AFC unit 5 compares the difference in frequency between the r.f. pulse oscillator 1 and the local oscillator 6 with the intermediate frequency of the receiver 16 and, if it differs from the assigned value of intermediate frequency, applies to the local oscillator an error (control) signal such that the local-oscillator frequency is changed so as to minimize the error.

The frequencies of the anode tank 2 and the grid tank 3 in the r.f. pulse oscillator 1 and the tuned circuit 7 of the local oscillator are swept as follows.

Rotation of the electric motor 36 (FIG. 4) is transmitted to the gear box 37 the output shaft of which relays the rotation via the friction coupling 38 to the reducing vernier 39 which is provided with reading dials and control knobs for manual tuning of the tanks and tuned circuits. From the output shaft 40 of the vernier 39, rotation is transmitted by the flexible coupling 41 to the shaft 42 and by the gears 47, 48, and 49 to the shaft 50.

The frequency of the anode tank 2 (FIG. 1) in the r.f. pulse oscillator is swept linearly.

Rotation of the gear 43 (FIG. 4) is transmitted by the idler gear 44 to the gear 45 and the pulley 46. The cord 52 entrained in the grooves in the pulley 46 and between the sheaves 51 converts the rotation of the pulley 46 into the rectilinear motion of the short-circuiting bridge 21 along the two-wire balanced line 20 of the anode tank 2 in the generator 1.

The frequency of the grid tank 3 (FIG. 1) of the generator 1 is swept in a predetermined manner by the programmer 35, as follows.

Rotation of the gear 47 (FIG. 4) is transmitted by the idler gear 48 to the gear 49 and the shaft 50, and as a consequence, to the cams 55. Upon rotating, the cams 55 actuate the driver 58 so as to turn the sector 60 through a maximum angle of 130°, thereby winding up the spiral spring 59, while the cord 53 entrained in the grooves in the sector 60 and between the sheaves 51 converts the rotation of the sector 60 into the rectilinear motion of the short-circuiting bridge 23 along the two-wire balanced line 22 of the grid tank 3 in the oscillator 1.

In the reverse direction, the short-circuiting bridge 23 is driven by the spiral spring 59 which rotates the sector 60 and causes the driver 58 to press the roller 57 against the lobes of the cams 55, with the result that the cord 53 moves the short-circuiting bridge 23 along the two-wire balanced line 22.

The frequency of the tuned circuit 7 (FIG. 1) in the local oscillator is swept also in a predetermined manner set by the programmer 35, as follows.

Wound up, as already described to produce a torque required to move the short-circuiting bridge 29 along the two-wire balanced line 28 of the tuned circuit 7 in the local oscillator 6, the spiral spring 64 (FIG. 4) rotates the sector 65, thereby causing the driver 63 to press the roller 62 against the lobes of the cams 56.

As the cams 56 rotate the spiral spring 64 is released, and the cord 54 entrained in the grooves in the sector 65 and between the sheaves 51 moves the short-circuiting bridge 29 along the two-wire balanced line 28 over a predetermined range.

In the reverse direction, the short-circuiting bridge 29 is driven as follows.

Upon rotating, the cams 56 cause the roller 62 and the driver 63 to rotate the sector 65 through a maximum angle of 130°, whereby the spiral spring 64 is wound and the cord 54 moves the short-circuiting bridge 29 along the two-wire balanced line 28.

This ensures provision of optimum conditions of oscillation for the oscillator 1 (FIG. 1) and coarse tracking between the local oscillator 6 and the r.f. pulse oscillator 1. Fine tracking is provided for by the AFC unit 5 of the local oscillator 6, which generates an error (control) signal whenever the frequency of the local oscillator 6 deviates from its correct value.

For studies of the temperature properties of the specimen 9, the latter positioned within the inductance coil 8 is loaded into the oven 10, the temperature in which can be held constant at any point between −170° and +200°C by the temperature controller 11. For studies at the temperature of liquid nitrogen, the specimen 9 within the inductance coil 8 is placed in the Dewar vessel 12, the latter of which is filled with liquid nitrogen having a level which is automatically maintained constant by the controller 13.

The pulsed radio spectrometer disclosed herein effectively searches for NQR signals whose frequency is unknown and especially weak signals the amplitude of which is comparable with or below that of noise. The radio spectrometer disclosed herein has provisions for searching the signal within a sub-band and for recording the signal spectrum on the strip chart of the recorder.

What is claimed is:

1. A pulsed VHF radio spectrometer for the investigation of nuclear quadrupole resonance (NQR) in solid test specimen comprising: a double tank r.f. pulse oscillator including an anode tank of said r.f. pulse oscillator; a tuning arrangement for said anode tank; a grid tank of said r.f. pulse oscillator; a tuning arrangement for said grid tank; a pulser connected to the input of said r.f. pulse oscillator; an automatic frequency control (AFC) unit connected to one of the outputs of said r.f. pulse oscillator; a local oscillator having an input connected to said AFC unit and having two outputs, one of which is connected to said AFC unit; a tuned circuit for said local oscillator; a tuning arrangement for said local oscillator tuned circuit, a drive kinematically linked to said tuning arrangement of said anode tank; a programmer kinematically connected to said drive, to said tuning arrangement of said grid tank and to said tuning arrangement of said local oscillator and made so that said grid tank in said r.f. pulse oscillator and said local tuned circuit are swept in frequency in a predetermined manner as required for matching the tuning of said tanks of said pulse oscillator and local oscillator tuned circuit; an inductance coil enclosing the solid test specimen, electrically connected to said r.f. pulse oscillator; a matching means to match the impedance of said inductance coil to the impedance of said anode tank in said r.f. pulse oscillator, which effects said electrical connection between said inductance coil and said oscillator and the circuit parameters of which, together with the circuit parameters of said inductance coil determine the requisite manner of sweeping said grid tank in said r.f. pulse oscillator and said local oscillator tuned circuit in frequency for matching the tuning of the tanks of said oscillator and said local oscillator; a mixer connected to said matching means and to the second output of said local oscillator; means for the reception and registration of NQR signals carrying information about the physico-chemical properties of said solid test specimen, electrically connected to said mixer and to said pulser, and means for maintaining the temperature of said solid test specimen.

2. A pulsed radio spectrometer as claimed in claim 1, said programmer being in the form of a cam mechanism having cams which are mounted on a common shaft in said drive, each said cam being profiled so that said grid tank in said r.f. pulse oscillator and said local oscillator tuned circuit are swept in frequency in the manner required to match the tuning of the grid tank of said pulse oscillator and the tuned circuit of said local oscillator.

3. A pulsed radio spectrometer, as in claim 1, in which said matching means to match the impedance of said inductance coil to the impedance of said anode tank in said r.f. pulse oscillator is in the form of two capacitors connected directly to said inductance coil, and long lines connecting said capacitors to said anode tank in saif r.f. pulse oscillator.

* * * * *